(12) United States Patent
Khandelwal et al.

(10) Patent No.: US 9,152,410 B2
(45) Date of Patent: Oct. 6, 2015

(54) AUTO-UPDATE WHILE RUNNING CLIENT INTERFACE WITH HANDSHAKE

(76) Inventors: Vaibhav Khandelwal, Redmond, WA (US); Brian Remick, Snoqualmie, WA (US); Kacey Abaraoha, Seattle, WA (US)

(*) Notice: Subject to any disclaimer, the term of this patent is extended or adjusted under 35 U.S.C. 154(b) by 123 days.

(21) Appl. No.: 13/528,860

(22) Filed: Jun. 21, 2012

(65) Prior Publication Data

US 2013/0346957 A1    Dec. 26, 2013

(51) Int. Cl.
*G06F 9/44* (2006.01)
*G06F 9/445* (2006.01)

(52) U.S. Cl.
CPC .......................................... *G06F 8/67* (2013.01)

(58) Field of Classification Search
CPC .......................................................... G06F 8/67
USPC ......................................................... 717/170
See application file for complete search history.

(56) References Cited

U.S. PATENT DOCUMENTS

| | | | |
|---|---|---|---|
| 5,410,703 A * | 4/1995 | Nilsson et al. | 717/168 |
| 7,779,402 B2 | 8/2010 | Abernethy et al. | |
| 2003/0066065 A1 | 4/2003 | Larkin | |
| 2003/0217257 A1* | 11/2003 | Ebsen et al. | 713/100 |
| 2006/0294498 A1* | 12/2006 | Partamian | 717/106 |
| 2008/0052701 A1* | 2/2008 | Abernethy et al. | 717/170 |
| 2008/0215915 A1* | 9/2008 | Zhou et al. | 714/15 |
| 2009/0217244 A1* | 8/2009 | Bozak et al. | 717/124 |
| 2010/0250908 A1* | 9/2010 | Amann et al. | 713/1 |
| 2011/0078675 A1* | 3/2011 | Van Camp et al. | 717/170 |
| 2013/0346957 A1* | 12/2013 | Khandelwal et al. | 717/170 |

FOREIGN PATENT DOCUMENTS

| | | |
|---|---|---|
| WO | 2011072716 A1 | 6/2011 |
| WO | WO 2011072716 A1 * | 6/2011 |

OTHER PUBLICATIONS

Milenovic, International Application Publication WO 2011/072716 A1 (Published Jun. 23, 2011) Applicant Provided Prior Art.*
Xiao, et al., "Towards Dynamic Component Updating: A Flexible and Lightvveight Approach", Retrieved at <<http://ieeexplore.ieee.org/stamp/stamp.jsp?tp=&arnumber=5254224>>, 33rd Annual IEEE International Computer Software and Applications Conference, Jul. 20, 2009, pp. 468-473.
Chandra, et al., "flockfs, a moderated group authoring system for wireless workgroups", Retrieved at <<http://www.chandrabrown.org/surendar/papers/mobiquitous09.pdf>>, 6th Annual International Conference on Mobile and Ubiquitous Systems: Computing, Networking & Services, MobiQuitous '09, Jul. 13, 2009, pp. 10.

(Continued)

*Primary Examiner* — Don Wong
*Assistant Examiner* — Theodore Hebert
(74) *Attorney, Agent, or Firm* — Aneesh Mehta; Kate Drakos; Micky Minhas (57) ABSTRACT

In one embodiment, a predecessor version of a client software application may execute a runtime handover to a successor version of the client software application. A client side device 110 may execute a predecessor version 112 of a client software application while installing a successor version 116 of the client software application. The client side device 110 may execute an update handshake between the successor version 116 and the predecessor version 112. The client side device 110 may execute a runtime validation of the successor version 116.

20 Claims, 5 Drawing Sheets

(56) References Cited

OTHER PUBLICATIONS

"Automatic client updates", Retrieved at <<http://www.winflector.com/auto-client-update.html>>, Retrieved Date: Feb. 23, 2012, p. 1.

"International Search Report", Mailed Date: Sep. 10, 2013, Application No. PCT/US2013/045530, Filed Date: Jun. 13, 2013, pp. 12.
Seifzadeh, et al., "A Survey of Dynamic Software Updating", Journal of Software: Evolution and Process, vol. 25, No. 5, Apr. 25, 2010, pp. 535-568.

* cited by examiner

AUTO-UPDATE WHILE RUNNING CLIENT INTERFACE WITH HANDSHAKE

BACKGROUND

A software developer may often continue to improve a software application after the software application has been released. The software developer may distribute multiple versions of the software application long after the initial version of the software application debuted. With the internet allowing a direct connection between the end user and the software developer, the software application may continually update from an application server maintained by the software developer.

SUMMARY

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

Embodiments discussed below relate to a predecessor version of a client software application executing a runtime handover to a successor version of the client software application. A client side device may execute a predecessor version of a client software application while installing a successor version of the client software application. The client side device may execute an update handshake between the successor version and the predecessor version. The client side device may execute a runtime validation of the successor version.

DRAWINGS

In order to describe the manner in which the above-recited and other advantages and features can be obtained, a more particular description is set forth and will be rendered by reference to specific embodiments thereof which are illustrated in the appended drawings. Understanding that these drawings depict only typical embodiments and are not therefore to be considered to be limiting of its scope, implementations will be described and explained with additional specificity and detail through the use of the accompanying drawings.

DETAILED DESCRIPTION

Embodiments are discussed in detail below. While specific implementations are discussed, these implementations are strictly for illustration purposes. A person skilled in the relevant art will recognize that other components and configurations may be used without parting from the spirit and scope of the subject matter of this disclosure. The implementations may be a machine-implemented method, a tangible machine-readable medium having a set of instructions detailing a method stored thereon for at least one processor, or a client side device.

A client side device may execute a client software application, such as a client interface for a cloud service, that uses an auto-updater to seamlessly transition from a predecessor version of the client software application to a successor version of the client software application. The predecessor version of the client software application is the current version being used, while the successor version is the version that is to replace the current version. The client side device may execute the transition transparently during runtime, without the user even noticing. The successor version may execute a runtime validation to assure that the successor version was installed properly.

The predecessor version may execute an update handshake to transition to the successor version without rebooting the client software application. At a high level, the update handshake may start the successor version of the client software application. The successor version may send a shutdown request to the predecessor version, asking the predecessor version to initiate shutdown and transition to the successor version. The predecessor version may reply with a shutdown status message, indicating if the predecessor version is ready to shutdown. The predecessor version may send a predecessor data set to the successor version, conveying to the successor version state data, such as the database state, current tasks, or other information.

If the runtime validation fails, the successor version may switch back to the predecessor version. The successor version may register any components to be used to complete the setup, such as a component object model. If the runtime validation is successful, the successor version may switch over any application entry points to point to the successor version while uninstalling the predecessor version.

Thus, in one embodiment, a predecessor version of a client software application may execute a runtime handover to a successor version of the client software application. A client side device may execute a predecessor version of a client software application while installing a successor version of the client software application. The client side device may execute an update handshake between the successor version and the predecessor version. The client side device may execute a runtime validation of the successor version.

Figure 1:
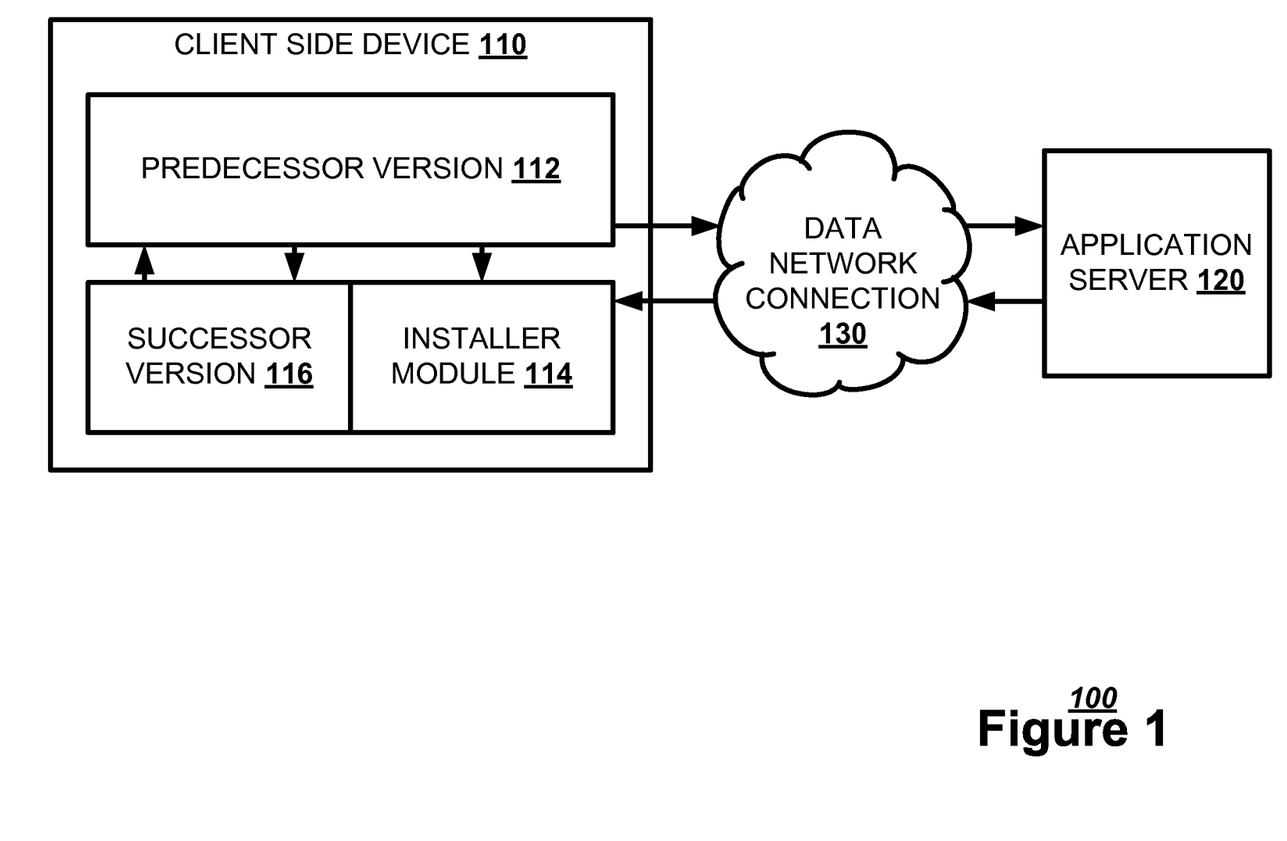
FIG. 1 illustrates, in a block diagram, one embodiment of an application updating network.

FIG. 1 illustrates, in a block diagram, one embodiment of an application updating network 100. A client side device 110 running a client software application, such as a client interface, may access an application server 120 via a data connection network 130 to check the application server 120 for updates to the client software application. A predecessor version 112 of the client software application may initiate an installer module 114 to check the application server 120 for an update. The installer module 114 may download and install a successor version 116 of the client software application. Further, the installer module 114 may execute a targeted inquiry of the application server 120 to check for minor updates and patches. Once the installer module 114 has successfully installed the successor version 116, the predecessor version 112 may execute an update handshake to prepare the successor version 116 function as the active version of the client software application.

Figure 2:
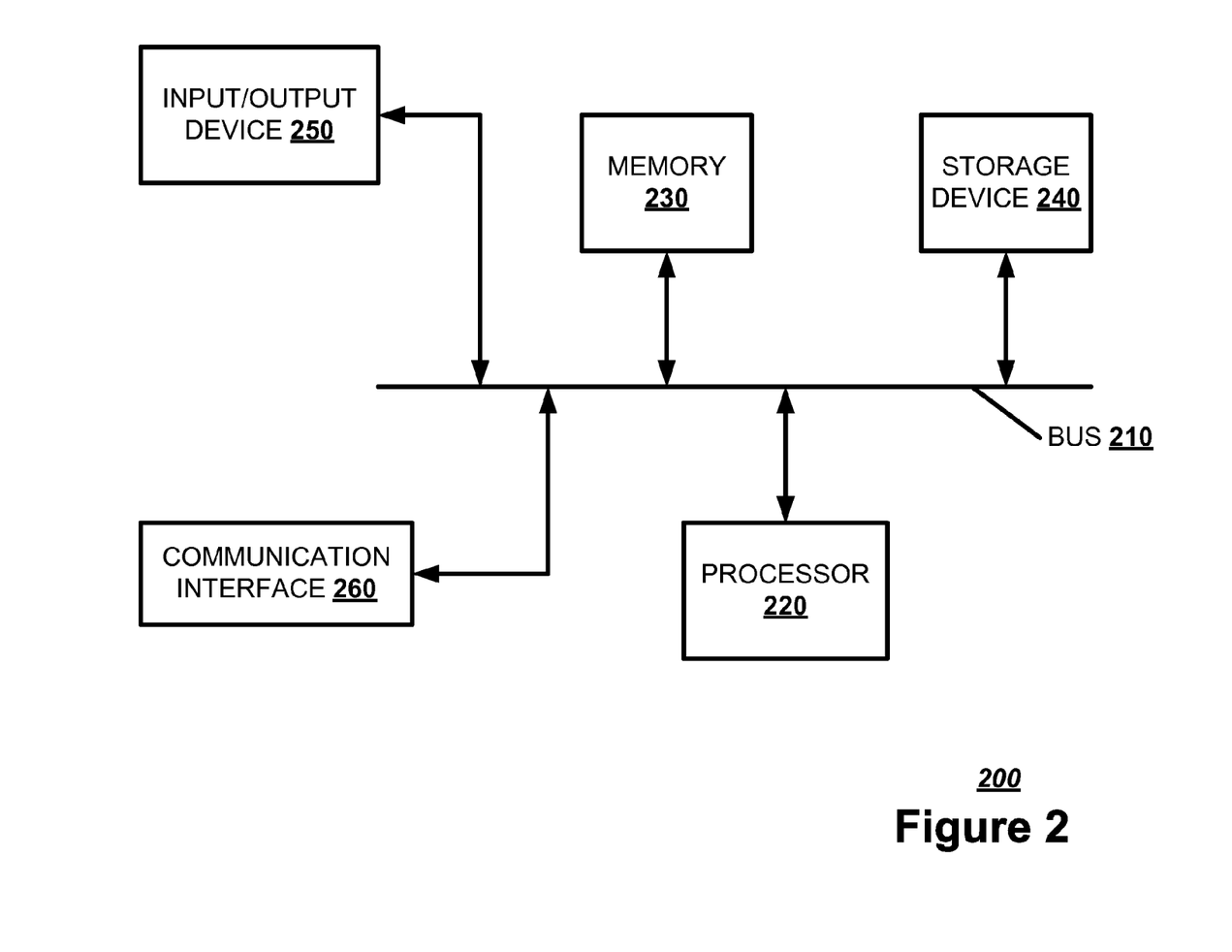
FIG. 2 illustrates, in a block diagram, one embodiment of a computing device.

FIG. 2 illustrates a block diagram of an exemplary computing device 200 which may act as a client side device 110. The computing device 200 may combine one or more of hardware, software, firmware, and system-on-a-chip technology to implement the client software application. The computing device 200 may include a bus 210, a processor 220, a memory 230, a data storage 240, an input/output device 250, and a communication interface 260. The bus 210, or other inter-component communication system, may permit communication among the components of the computing device 200.

The processor 220 may include at least one conventional processor or microprocessor that interprets and executes a set of instructions. The memory 230 may be a random access memory (RAM) or another type of dynamic storage device that stores information and instructions for execution by the processor 220. The memory 230 may also store temporary variables or other intermediate information used during execution of instructions by the processor 220. The data storage 240 may include a conventional ROM device or another type of static storage device that stores static information and instructions for the processor 220. The storage device 240 may include any type of tangible machine-readable medium, such as, for example, magnetic or optical recording media, such as a digital video disk, and its corresponding drive. A tangible machine-readable medium is a physical medium storing machine-readable code or instructions, as opposed to a transitory medium or signal. The storage device 240 may store a set of instructions detailing a method that when executed by one or more processors cause the one or more processors to perform the method.

The input/output device 250 may include one or more conventional mechanisms that permit a user to input information to the computing device 200, such as a keyboard, a mouse, a voice recognition device, a microphone, a headset, a gesture recognition device, a touch screen, gesture capture, etc. The input/output device 250 may include one or more conventional mechanisms that output information to the user, including a display, a printer, one or more speakers, a headset, or a medium, such as a memory, or a magnetic or optical disk and a corresponding disk drive. The communication interface 260 may include any transceiver-like mechanism that enables computing device 200 to communicate with other devices or networks. The communication interface 260 may be a wireless, wired, or optical interface.

The computing device 200 may perform such functions in response to a processor 220 executing sequences of instructions contained in a computer-readable medium, such as, for example, the memory 230, a magnetic disk, or an optical disk. Such instructions may be read into the memory 230 from another computer-readable medium, such as the storage device 240, or from a separate device via the communication interface 260.

Figure 3:
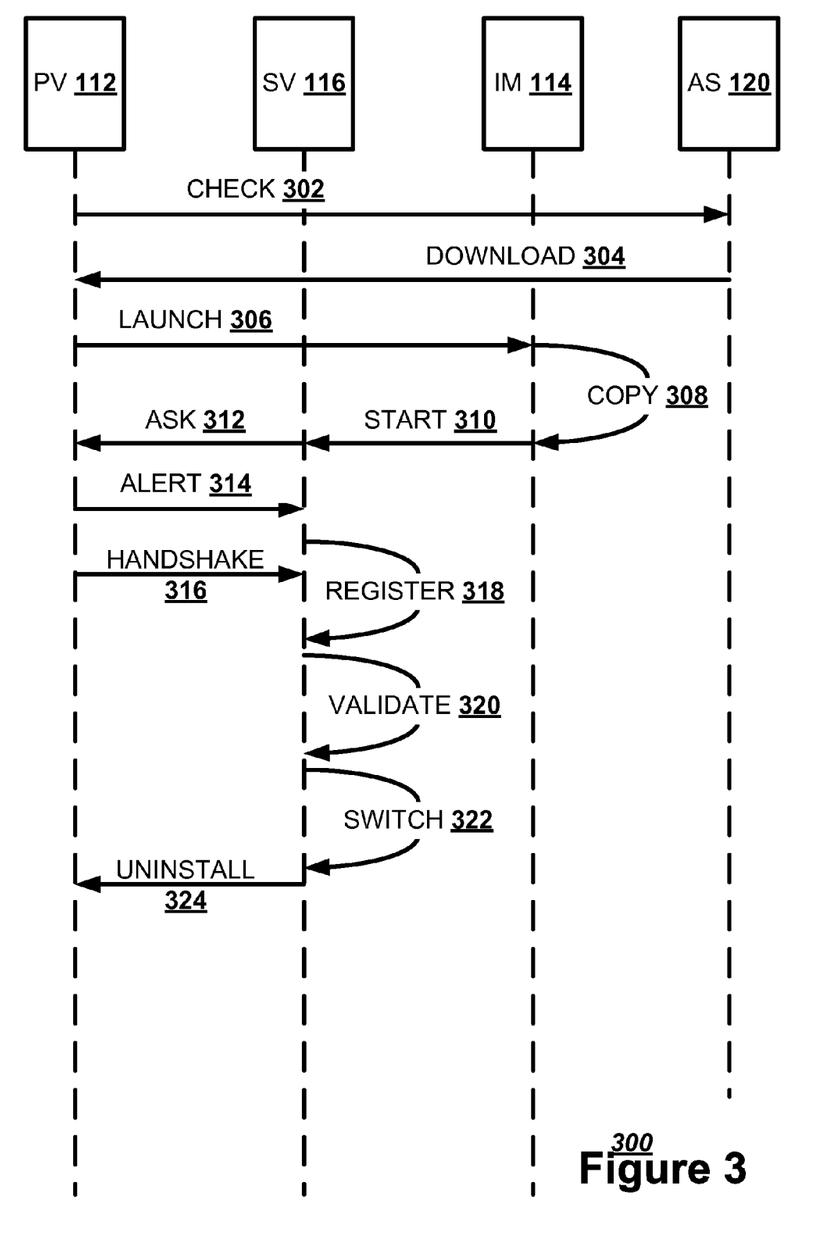
FIG. 3 illustrates, in a flow diagram, one embodiment of an application update exchange.

FIG. 3 illustrates, in a flow diagram, one embodiment of an application update exchange 300. The predecessor version (PV) 112 may check 302 with the application server (AS) 120 to see if an update is available. If the update is available, the application server 120 may download 304 an installer module (IM) 114 to the predecessor version 112. If no update is found, the application server 120 may retry at a later time. The predecessor version 112 may launch 306 the installer module 114. The installer module 114 may copy 308 the files for the successor version (SV) 116 to the file system for the client side device 110. The installer module 114 may start 310 the successor version 116. The successor version 116 may ask 312 whether the predecessor version 112 is ready to shut down by sending a shutdown request.

The predecessor version 112 may alert 314 the successor version 116 when the predecessor version 112 is in a "shutdown ready" state by sending a shutdown status message. The predecessor version 112 may send an update handshake 316 to the successor version 116 providing an application state data set, such as a processor state data set. If the predecessor version 112 is ready to shut down, the successor version 116 may register 318 any components to complete setup. The successor version 116 may validate 320 at runtime component registrations once setup completes. If the runtime validation is successful, the successor version 116 may switch 322 over any application entry points to point to the successor version 116, so that queries or commands to the software application go to the successor version 116. If the runtime validation is successful, the predecessor version 112 may uninstall 324.

Figure 4:
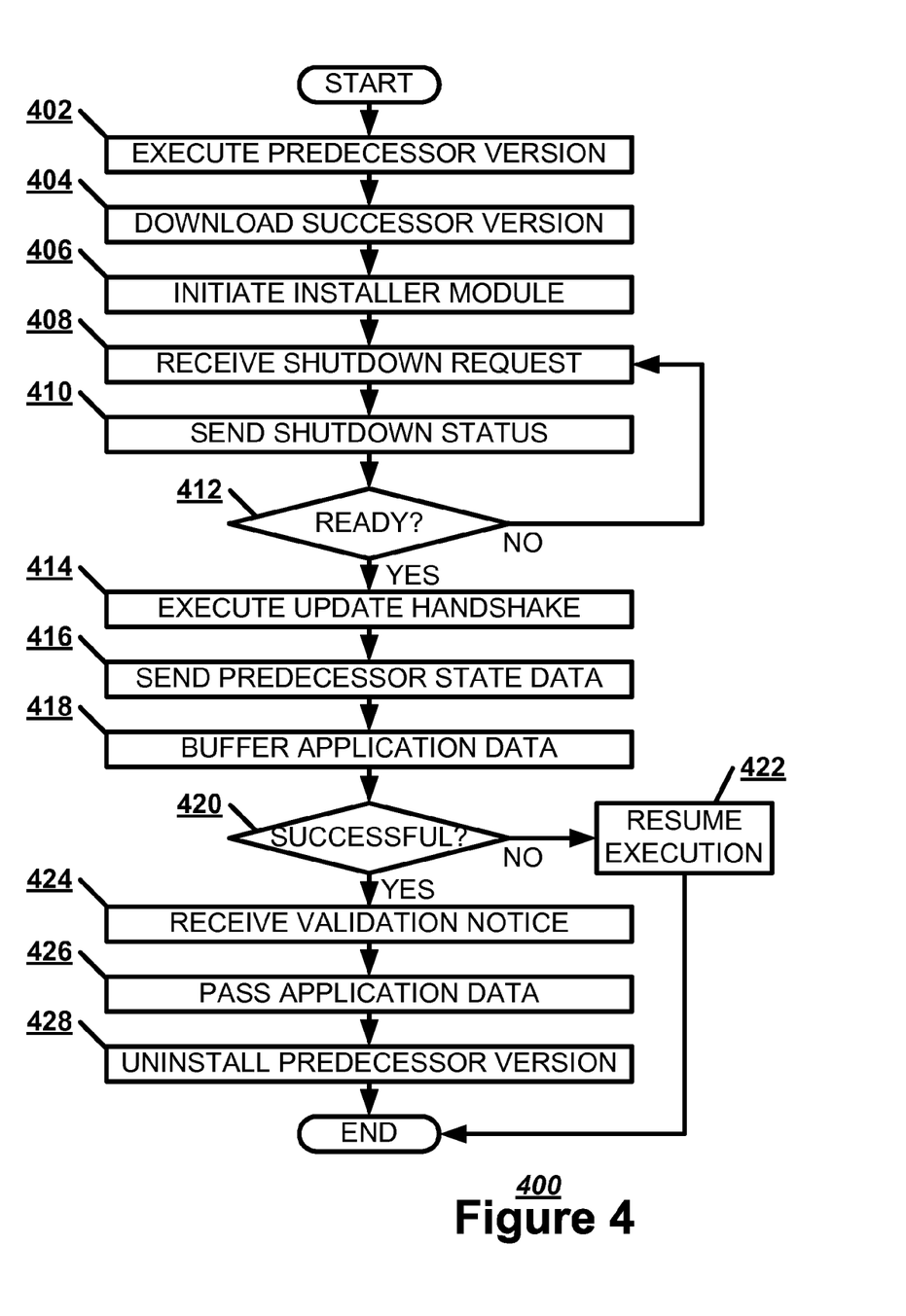
FIG. 4 illustrates, in a flowchart, one embodiment of a method for updating a client software application using a predecessor version of the client software application.

FIG. 4 illustrates, in a flowchart, one embodiment of a method 400 for updating a client software application using a predecessor version 112 of the client software application. The client side device 110 may execute a predecessor version 112 of a client software application (Block 402). The predecessor version 112 may download the successor version from an application server 120 (Block 404). The predecessor version 112 may initiate an installer module 114 to install the successor version 116 (Block 406). The predecessor version 112 may receive a shutdown request from the successor version 116 asking the predecessor version 112 to shut down (Block 408). The predecessor version 112 may send a shutdown status message to the successor version 116 indicating whether the predecessor version 112 is ready to shut down (Block 410). If the predecessor version 112 indicates in the shutdown status message that the predecessor version 112 is not ready to shut down (Block 412), the predecessor version 112 may receive a repeated shutdown request from the successor version 116 after the successor version has waited for a cooling period and then resent the shutdown request (Block 408).

If the predecessor version 112 indicates in the shutdown status message readiness to shut down (Block 412), the predecessor version 112 may execute an update handshake with the successor version 116 upon installation of the successor version 116 (Block 414). The predecessor version 112 may send a predecessor state data set to the successor version 116 as part of the update handshake (Block 416). If the predecessor version 112 receives any new interim application data from the user while setting up the successor version 116, the predecessor version 112 may buffer any interim application data received by the predecessor version 112 after the installation begins (Block 418). If the runtime validation of the successor version 116 was unsuccessful (Block 420), the client device 110 may resume normal execution of the predecessor version 112 upon startup failure or validation failure by the successor version 116 (Block 422).

If the runtime validation of the successor version 116 was successful (Block 420), the predecessor version 112 may receive a validation notice from the successor version 116 (Block 424). The predecessor version 112 may pass any interim application data received by the predecessor version 112 to the successor version 116, whether buffered or newly received (Block 426). The client device 110 may uninstall the predecessor version 112 upon successful startup and validation of the successor version 116 (Block 428).

Figure 5:
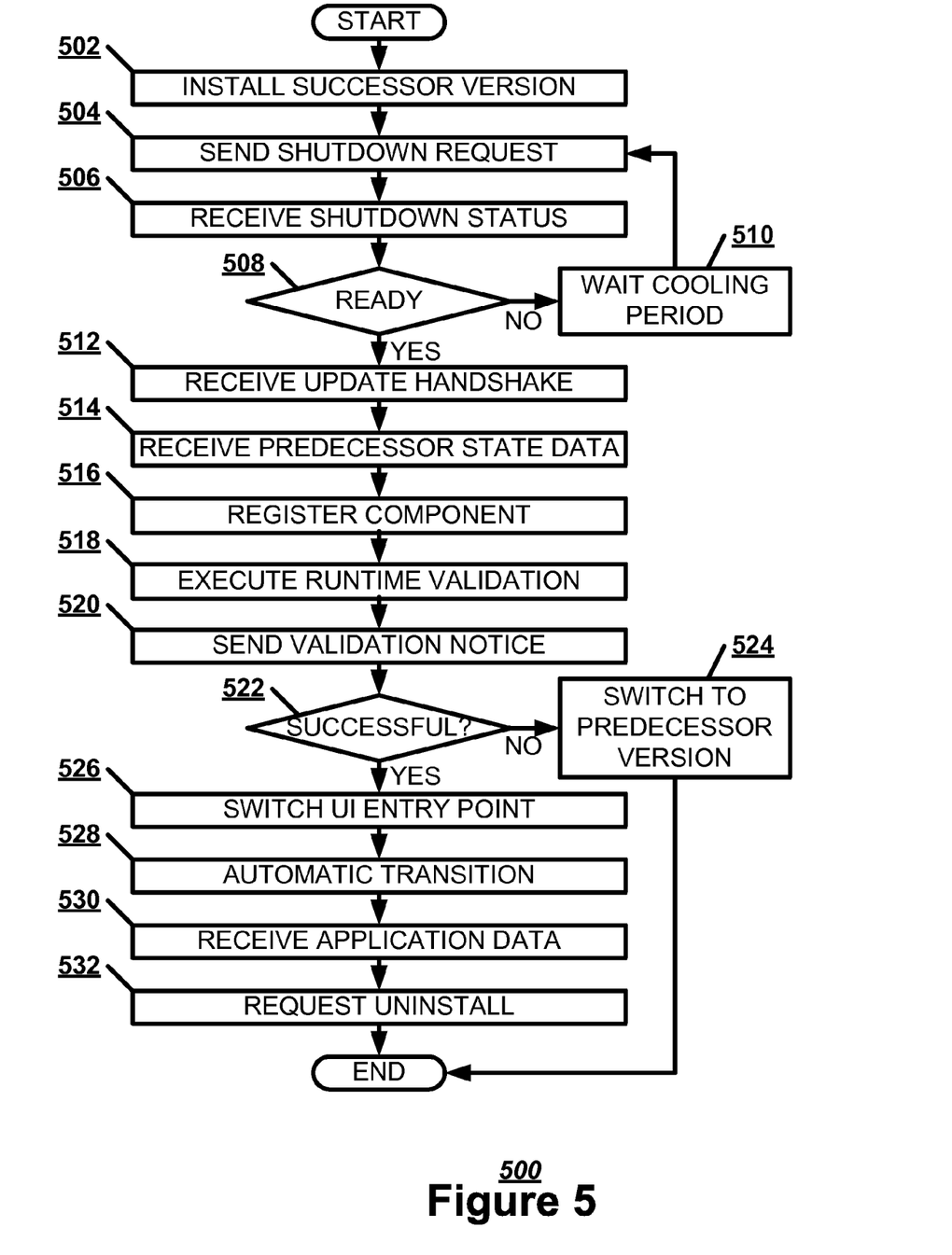
FIG. 5 illustrates, in a flowchart, one embodiment of a method for updating a client software application using a successor version of the client software application.

FIG. 5 illustrates, in a flowchart, one embodiment of a method 500 for updating a client software application using a successor version of the client software application. The client side device 110 may install a successor version 116 of a client software application (Block 502). The successor version 116 may send a shutdown request to the predecessor version 112 (Block 504). The successor version 116 may receive a shutdown status message from the predecessor version 112 indicating whether the predecessor version 112 is ready to shut down (Block 506). If the predecessor version 112 indicates in the shutdown status message that the predecessor version 112 is not ready to shut down (Block 508), the successor version may wait a cooling period (Block 510) before resending the shutdown request to the predecessor version 112 (Block 504).

If the predecessor version 112 indicates in the shutdown status message readiness to shut down (Block 508), the successor version 116 may receive an update handshake from the predecessor version 112 (Block 512). The successor version 116 may receive a predecessor state data set from the predecessor version 112 as part of the update handshake (Block 514). The successor version 116 may register a component (Block 516). The successor version 116 may execute a runtime validation of the successor version 116 while the predecessor version 112 of the client software application is executing (Block 518). The successor version 116 may send a validation notice to the predecessor version 112 indicating the results of the runtime validation (Block 520).

If the runtime validation of the successor version 116 was unsuccessful (Block 522), the client device 110 may switch a user back to the predecessor version 112 upon startup failure or validation failure by the successor version 116 (Block 524). If the runtime validation of the successor version 116 was successful (Block 522), the successor version 116 may switch an application entry point from the predecessor version 112 to the successor version 116 (Block 526). The client side device 110 may automatically transition from the predecessor version 112 to the successor version 116 (Block 528). The successor version 116 may receive any interim application data received by the predecessor version 112 after the installation began (Block 530). The successor version 116 may request that the client side device 110 uninstall the predecessor version 112 upon a successful startup and validation of the successor version 116 (Block 532).

Although the subject matter has been described in language specific to structural features and/or methodological acts, the subject matter in the appended claims is not necessarily limited to the specific features or acts described above. Rather, the specific features and acts described above are disclosed as example forms for implementing the claims.

Embodiments within the scope of the present invention may also include non-transitory computer-readable storage media for carrying or having computer-executable instructions or data structures stored thereon. Such non-transitory computer-readable storage media may be any available media that can be accessed by a general purpose or special purpose computer. By way of example, and not limitation, such non-transitory computer-readable storage media can comprise RAM, ROM, EEPROM, CD-ROM or other optical disk storage, magnetic disk storage or other magnetic storage devices, or any other medium which can be used to carry or store desired program code means in the form of computer-executable instructions or data structures. Combinations of the above may be within the scope of the non-transitory computer-readable storage media.

Embodiments may also be practiced in distributed computing environments where tasks are performed by local and remote processing devices that are linked (either by hardwired links, wireless links, or by a combination thereof) through a communications network.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Although the above description may contain specific details, they should not be construed as limiting the claims in any way. Other configurations of the described embodiments are part of the scope of the disclosure. For example, the principles of the disclosure may be applied to each individual user where each user may individually deploy such a system. This enables each user to utilize the benefits of the disclosure even if any one of a large number of possible applications do not use the functionality described herein. Multiple instances of electronic devices each may process the content in various possible ways. Implementations are not necessarily in one system used by all end users. Accordingly, the appended claims and their legal equivalents should only define the invention, rather than any specific examples given.

We claim:

1. A machine-implemented method, comprising:
installing a successor version of a client software application;
receiving an update handshake in the successor version from the predecessor version upon the predecessor version indicating a readiness to transparently transition during runtime when the predecessor version is in a shutdown ready state;
registering a component with the successor version;
executing a runtime validation of the successor version while a predecessor version of the client software application is executing; and
switching an application entry point from the predecessor version to the successor version when the runtime validation is successful.

2. The method of claim 1, further comprising:
sending a shutdown request from the successor version to the predecessor version.

3. The method of claim 1, further comprising:
waiting a cooling period before resending a shutdown request to the predecessor version if the predecessor version is not ready.

4. The method of claim 1, further comprising:
receiving a shutdown status message from the predecessor version indicating whether the predecessor version is ready to shutdown.

5. The method of claim 4, further comprising:
receiving a predecessor state data set from the predecessor version to the successor version as part of the update handshake.

6. The method of claim 1, further comprising:
requesting the predecessor version be uninstalled upon a successful startup and validation of the successor version.

7. The method of claim 1, further comprising:
automatically transitioning from the predecessor version to the successor version.

8. The method of claim 1, further comprising:
sending a validation notice from the successor version to the predecessor version.

9. The method of claim 1, further comprising:
switching a user back to the predecessor version upon validation failure by the successor version.

10. A tangible machine-readable medium having a set of instructions detailing a method stored thereon that when executed by one or more processors cause the one or more processors to perform the method, the method comprising:
  executing a predecessor version of a client software application;
  receiving a shutdown request from a successor version asking the predecessor version to shut down upon installation of the successor version;
  sending a shutdown status message from the predecessor version to the successor version indicating a readiness of the predecessor version to shut down;
  executing an update handshake between the successor version of the client software application and the predecessor version to transparently transition during runtime between the predecessor version and the successor version; and
  buffering interim application data received from the user by the predecessor version after the installation begins.

11. The tangible machine-readable medium of claim 10, wherein the method further comprises:
  sending a predecessor state data set from the predecessor version to the successor version as part of the update handshake.

12. The tangible machine-readable medium of claim 10, wherein the method further comprises:
  receiving a validation notice from the successor version indicating a runtime validation was successful.

13. The tangible machine-readable medium of claim 10, wherein the method further comprises:
  downloading the successor version from an application server.

14. The tangible machine-readable medium of claim 10, wherein the method further comprises:
  initiating an installer module to install the successor version.

15. The tangible machine-readable medium of claim 10, wherein the method further comprises:
  passing interim application data received by the predecessor version to the successor version.

16. The tangible machine-readable medium of claim 10, wherein the method further comprises:
  uninstalling the predecessor version upon successful validation of the successor version.

17. The tangible machine-readable medium of claim 10, wherein the method further comprises:
  resume normal execution of the predecessor version upon validation failure by the successor version.

18. A client side device, comprising:
  a communication interface that downloads a successor version of a client software application from an application server; and
  a processor that executes a predecessor version of the client software application while installing a successor version of the client software application, executes an update handshake between the successor version and the predecessor version upon the predecessor version indicating a readiness to shut down, executes a runtime validation of a component registration of the successor version, switches an application entry point from the predecessor version to the successor version upon a successful validation, and transparently transitions from the predecessor version to the successor version.

19. The client side device of claim 18, wherein the processor uninstalls the predecessor version upon successful validation of the successor version.

20. The client side device of claim 18, wherein the processor switches a user back to the predecessor version upon validation failure by the successor version.

* * * * *